US009971716B2

(12) United States Patent
Anyuru et al.

(10) Patent No.: US 9,971,716 B2
(45) Date of Patent: May 15, 2018

(54) METHOD, SYSTEM AND ARCHITECTURE FOR BUS TRANSACTION LOGGER

(71) Applicant: TELEFONAKTIEBOLAGET L M ERICSSON (PUBL), Stockholm (SE)

(72) Inventors: Andreas Anyuru, Lund (SE); Per-Inge Tallberg, Lund (SE); Staffan Månsson, Åkarp (SE); Ulf Morland, Åkarp (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 497 days.

(21) Appl. No.: 14/136,700

(22) Filed: Dec. 20, 2013

(65) Prior Publication Data

US 2015/0178232 A1    Jun. 25, 2015

(51) Int. Cl.
| | |
|---|---|
| G06F 13/36 | (2006.01) |
| G06F 13/362 | (2006.01) |
| G06F 11/34 | (2006.01) |
| G06F 11/14 | (2006.01) |

(52) U.S. Cl.
CPC ........ *G06F 13/362* (2013.01); *G06F 11/3476* (2013.01); *G06F 11/141* (2013.01); *G06F 11/348* (2013.01); *G06F 2201/87* (2013.01)

(58) Field of Classification Search
None
See application file for complete search history.

(56) References Cited

U.S. PATENT DOCUMENTS

| | | | | |
|---|---|---|---|---|
| 5,938,775 | A | * | 8/1999 | Damani .............. G06F 11/1438 714/15 |
| 6,584,586 | B1 | * | 6/2003 | McCoy ............... G06F 11/3636 714/45 |
| 7,447,946 | B2 | | 11/2008 | McHale et al. |
| 2007/0209039 | A1 | * | 9/2007 | Kitagawa ............... G06F 9/544 719/314 |
| 2011/0202801 | A1 | | 8/2011 | Horley et al. |
| 2012/0042202 | A1 | * | 2/2012 | Wenzel ................ H04L 41/069 714/6.3 |
| 2012/0265910 | A1 | | 10/2012 | Galles et al. |
| 2013/0304955 | A1 | | 11/2013 | Shirlen et al. |

(Continued)

FOREIGN PATENT DOCUMENTS

| | | |
|---|---|---|
| EP | 0 664 511 A2 | 7/1995 |
| EP | 0 665 511 A2 * | 7/1995 |

OTHER PUBLICATIONS

International Search Report issued in corresponding International application No. PCT/EP2014/076774, dated May 26, 2015.

(Continued)

*Primary Examiner* — Ilwoo Park
(74) *Attorney, Agent, or Firm* — Patent Portfolio Builders PLLC

(57) ABSTRACT

A computing device includes at least one master unit; at least one slave unit; an interconnect structure configured to route transactions from the at least one master unit to the at least one slave unit; and a transaction logger device configured to intercept and save a record of outstanding transactions sent by the at least one master unit to the interconnect structure. The transaction logger device is further configured to preserve the record of outstanding transactions when at least a part of the computing device is restarted.

23 Claims, 9 Drawing Sheets

(56) References Cited

U.S. PATENT DOCUMENTS

2014/0143463 A1* 5/2014 Mou .................. G06F 11/349
710/110

OTHER PUBLICATIONS

IEEE Standards Association; "IEEE Standard for Test Access Port and Boundary-Scan Architecture"; IEEE Std 1149.1; IEEE Computer Socienty; May 13, 2013; pp. 1-444; New York, NY.
Written Opinion dated May 26, 2015 in related International Application No. PCT/EP2014/076774 references from Written Opinion not cited herewith were previously cited in IDS dated May 28, 2015).

* cited by examiner

| Transaction ID | Read or Write | Address | Data (if write) |
|---|---|---|---|
| 0x00DD_0002 | READ | 0xABFF_0000 | |
| 0x00DD_0004 | WRITE | 0xD800_0080 | 0xD00_00C0 |
| | | | |

600 →
602 →

METHOD, SYSTEM AND ARCHITECTURE FOR BUS TRANSACTION LOGGER

TECHNICAL FIELD

The present invention generally relates to systems, software and methods and, more particularly, to mechanisms and techniques for recording information related to outstanding transactions in a computing device and saving the information to survive a reset of the computing device.

BACKGROUND

An explosion of computing devices, stationary and portable, is currently underway. These computing devices include, but are not limited to, smartphones, laptops, tablets, phablets, etc. Demand for these devices is made more acute by social media's rapid evolution, which encourages a need to communicate and be in contact with others. This creates continual competition among various manufacturers to generate better and faster computing devices.

However, an issue common to all these computing devices during development (and later) is reliability, i.e., the robustness, stability and interaction of their hardware and software. Most computer users have experienced the "blue screen of death," i.e., the screen computers typically show after a system failure, for whatever reason. Launching a computing device with this type of issue on the market can be very damaging to its manufacturer.

To prevent or minimize this issue, manufacturers expend great effort (in both time and money) to debug and resolve potential errors of new devices. The faster these errors can be found and corrected, the faster the devices can be launched, generating income and positive press.

Fear is high of launching a new computing device that is error-prone, so some manufacturers limit the volumes of initial new device being launched. If a problem is found early by customers or by the manufacturer's engineers, negative public feedback is minimized. However, this approach limits a manufacturer's income potential. If an error is found, it becomes the manufacturer's priority to identify which hardware component or line(s) of code caused the problem so adjustments can be made and production corrected and ramped up. If the error detection process is lengthy, which might be the case with complex computing devices, that product's future may be compromised.

Thus, there is interest in mechanisms that quickly identify which hardware and/or code produces errors. A common and difficult error to solve in new computing devices is a system hang (or freeze). A hang can have several causes. Two such examples are now discussed. One involves a programming error, i.e., the computing device's software includes, for example, an infinite loop. More specifically, the infinite loop may be stuck on a spinlock in a kernel driver. Another example involves the processor's access to a hardware block that is not clocked or is powered off. In this situation, the processor enters into a real lockup during which the processor freezes and does not answer any interrupts. In the first example, it is possible to take control of the processor, for example, via a high-priority interrupt that a watchdog can trigger before it performs an actual system reset. With this interrupt handler, the operator may be able to dump as much information on the state of the device as possible (e.g., the content of the processor registers and of different memories). An engineer can then use this information to determine the cause of the system hang. In the second situation, it is much more difficult to find a freeze's root cause. Depending on the platform and hardware used in devices, different causes may be responsible for freezes or system failures.

One approach for identifying errors in a new computing device is now discussed with regard to U.S. Pat. No. 7,447,946, (the '946 patent herein) the entire content of which is incorporated herein by reference. As illustrated in FIG. 1, which corresponds to FIG. 1 of the '946 patent, a data processing apparatus 10 is a System-on-Chip (SoC) device having plural master devices 30 and 40 connected through a bus 20 to a slave device 60. Master devices 30 and 40 connect through a cache 50 to bus 20. Other system devices and peripherals 65 may be connected to bus 20, some of which are master devices and others are slave devices.

Cache 50 is configured to store information related to activities of the master modules. Based on this information, an engineer may determine an error in data processing device 10. Thus, the '946 patent solution relies on utilizing an existing cache connected to plural master devices. Information is saved in this cache together with data the cache would normally store. However, other master devices 65 do not have a cache, for example, modem hardware accelerators, graphics accelerators, direct memory access (DMA) controllers, video accelerators, microcontrollers such, as for example, ARM's M0-M4 series, etc. This means that if one of these master devices 65 initiates a transaction on a bus that hangs the system, the engineer will not be able to find in the cache 50 information regarding that master device's activity prior to freezing, making it impossible to determine why there was a system hang.

In addition, because the '946 patent focuses on reusing a part of an existing cache, it will typically mean that the data processing device will only trace transactions when it knows in advance it will debug a problem or investigate performance. While this can be useful, it is very limiting and requires advance preparation, which might be a luxury when debugging a device. This is especially true for a modem in which network signaling and current radio conditions can result in very different system behavior that can take a long time to reproduce during problem troubleshooting.

Further, selecting an existing cache to trace transactions only during debug sessions is intrusive because part of the cache cannot be used to cache the "usual data" at the same time. Furthermore, the '946 patent does not address at all the problem of losing information stored in the cache when the data processing device is reset.

Thus, there is a need to develop a mechanism and a method capable of recording and preserving information related to an error affecting a computing device if the computing device shuts down. Accordingly, it would be desirable to provide devices, systems and methods that avoid the afore-described problems and drawbacks.

SUMMARY

Innovative computing devices may include hardware, software and complex interactions between these two components. Inevitably, due to the sheer complexity of these computing devices, internal errors remain undetected until the devices are sold on the market. Severe undetected errors undermine product credibility and, ultimately, manufacturer credibility. All errors slow down new product deployment. Thus, there a need for architecture and methods to facilitate early error detection.

According to one embodiment, there is a computing device that includes at least one master unit, at least one slave unit, an interconnect structure configured to route transactions from the at least one master unit to the at least one slave unit, and a transaction logger device configured to intercept and save a record of outstanding transactions sent by the at least one master unit to the interconnect structure. The transaction logger device is further configured to preserve the record of outstanding transactions when at least part of the computing device is restarted.

According to another embodiment, there is a method for preserving information after a computing device is reset. The method includes a step of collecting at a transaction logger device a record associated with an outstanding transaction initiated by a master unit of the computing device, a step of receiving a reset signal at the transaction logger device indicating that the computing device is going to be reset, and a step of saving the record to survive the reset. The outstanding transaction is sent to a slave unit over an interconnect structure.

Thus, it is an object to overcome some of the deficiencies discussed in the previous section and to provide an architecture and/or method and/or computing device that includes a mechanism for storing error-related information and preserving it in case the computing device shuts down or freezes. One or more of the independent claims advantageously provides such a mechanism.

BRIEF DESCRIPTION OF THE DRAWINGS

The accompanying drawings, which are incorporated in and constitute a part of the specification, illustrate one or more embodiments and, together with the description, explain these embodiments. In the drawings:

FIG. 6 schematically illustrates information stored in the transaction logger device;

DETAILED DESCRIPTION

Figure 1:
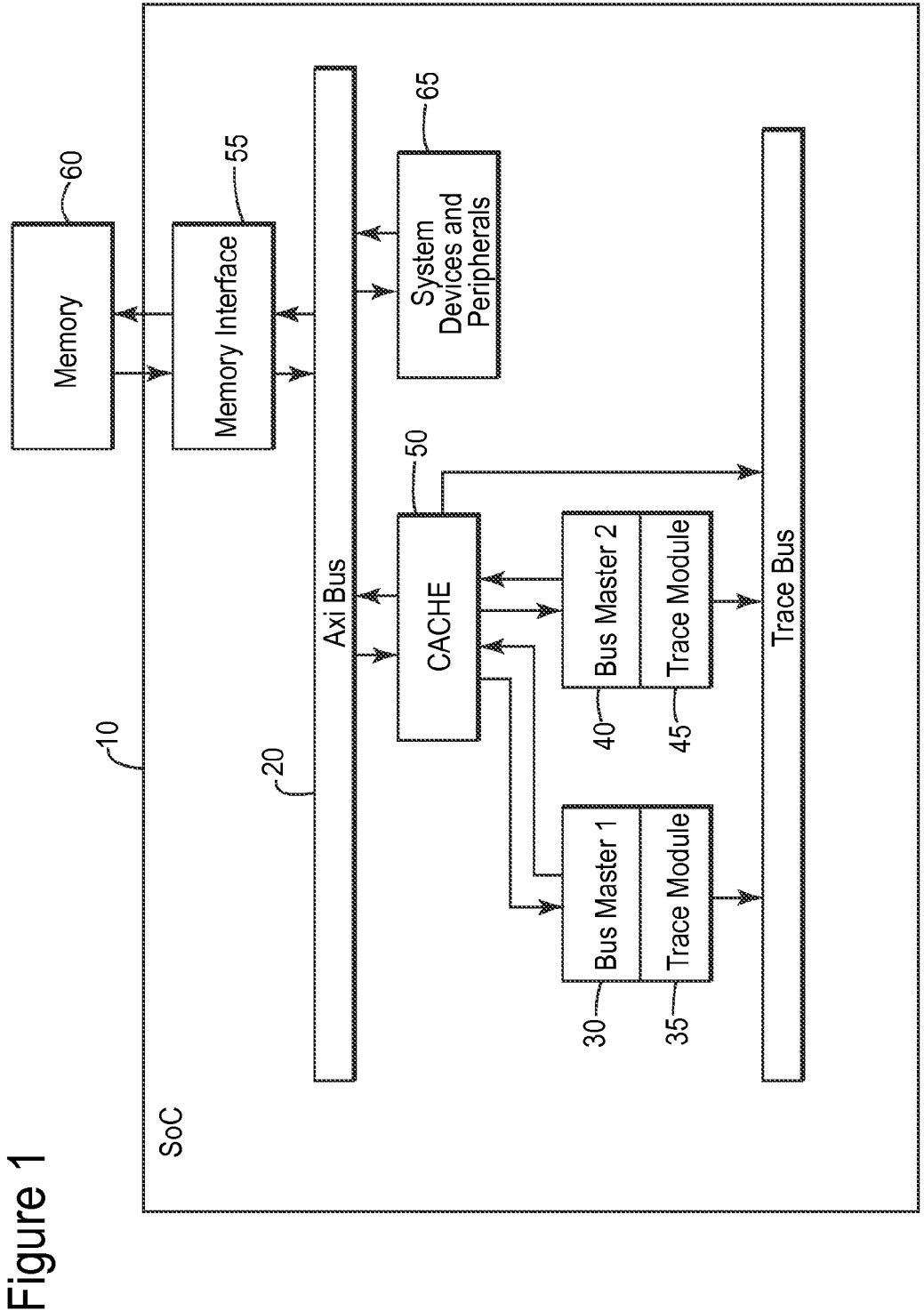
FIG. 1 is a schematic diagram of a conventional computing device.

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to the terminology and structure of a system-on-chip (SoC). However, the novel embodiments are not limited to SoC devices, but may be applied to other types of computing devices.

Reference throughout the specification to "one embodiment" or "an embodiment" means that a particular feature, structure or characteristic described in connection with an embodiment is included in at least one embodiment of the present invention. Thus, the appearance of the phrases "in one embodiment" or "in an embodiment" in various places throughout the specification is not necessarily all referring to the same embodiment. Further, the particular features, structures or characteristics may be combined in any suitable manner in one or more embodiments.

According to an embodiment, there is a computing device that includes at least one master unit, at least one slave unit and an interconnect structure connecting the at least one master unit to the at least one slave unit. The interconnect structure is configured to route transactions from the at least one master unit to the at least one slave unit. A transaction logger device is configured to receive and save a record of outstanding transactions initiated by the at least one master unit. The transaction logger device is also configured to preserve the record of outstanding transactions when the at least one master unit or the entire computing device are restarted. A more detailed discussion of this computing device is now presented. The computing device may include a SoC device and the master and slave units, and the interconnect structure may be part of the SoC device.

It is believed that clarification for some terms used herein is in order. A SoC device, as the name suggests, is an integrated circuit that integrates all components of a computing device, e.g., smartphone, laptop, computer, tablet, phablet, MP3 player, DVD player, TV set or other electronic system into a single chip. The SoC device may contain digital, analog, mixed-signal, and often radio-frequency functions, all on the single chip substrate. Dedicated terminology for SoC is master unit, slave unit, interconnect. The following embodiments use, for simplicity, a SoC device having master units, slave units and an interconnect. However, these terms should not be construed to limit the applicability of the novel concepts discussed herein. In other words, these terms are also applicable to a non-SoC device.

For example, a traditional computer includes, among other things, a processor, a memory, a graphic processor, a modem, graphics accelerators, a DMA controller, video accelerators, microcontrollers, etc. Some of these elements are considered to be master units while others are considered slave units. In one application, a master unit is any unit that initiates a transaction. A slave unit is any unit that acts upon the transaction. The interconnect is any bus structure over which these transactions are routed. Many embedded products presently use one of the AMBA (Advanced Microcontroller Bus Architecture) buses such as the AXI (Advanced eXtensible Interface) bus. This and many other bus architectures use the concept of a master and a slave. Simply put, a master can initiate a transaction on the bus, while a slave cannot.

A transaction encompasses one or more operations that carry some form of data (or payload), but also operations that have no payload. The term "transaction" is considered in the following to encompass any information that may be indicative of an action started by the master unit. An example of an action started by the master unit is a "write" command or a "read" command. Those skilled in the art would recognize that the term "action" includes other activities performed by the master unit.

The SoC device is used in the following to explain the novel features not only because it is currently used in mobile phone and other computing systems, but also because this type of device has specific features that create a specific class of errors as now discussed. For those SoC devices and others that are used on portable systems, power consumption is a matter of concern due to limited available battery power. Thus, SoC devices have different kinds of power management strategies, for example, one in which the clock for different hardware blocks is disabled (often referred to as clock gating) when the hardware block is not used. The different hardware blocks can also be powered off (often referred to as power gating) to save power. Thus, to save power, clock gating and/or power gating are applied to certain parts of the computing device that are not expected to be used.

However, if a master unit initiates a read or write transaction on the AXI bus for a slave unit that is not clocked or powered, the slave unit cannot complete the transaction. Thus, the master unit trying to access that slave unit or trying to access through the same path of the interconnect will freeze. When this happens, it is currently not possible to determine which transaction was not completed. A reset of the computing device can be triggered, either manually by pressing a button, or automatically by a watchdog timer, which times out. However, after the reset, the information that could be used to troubleshoot the problem is normally erased.

Figure 2:
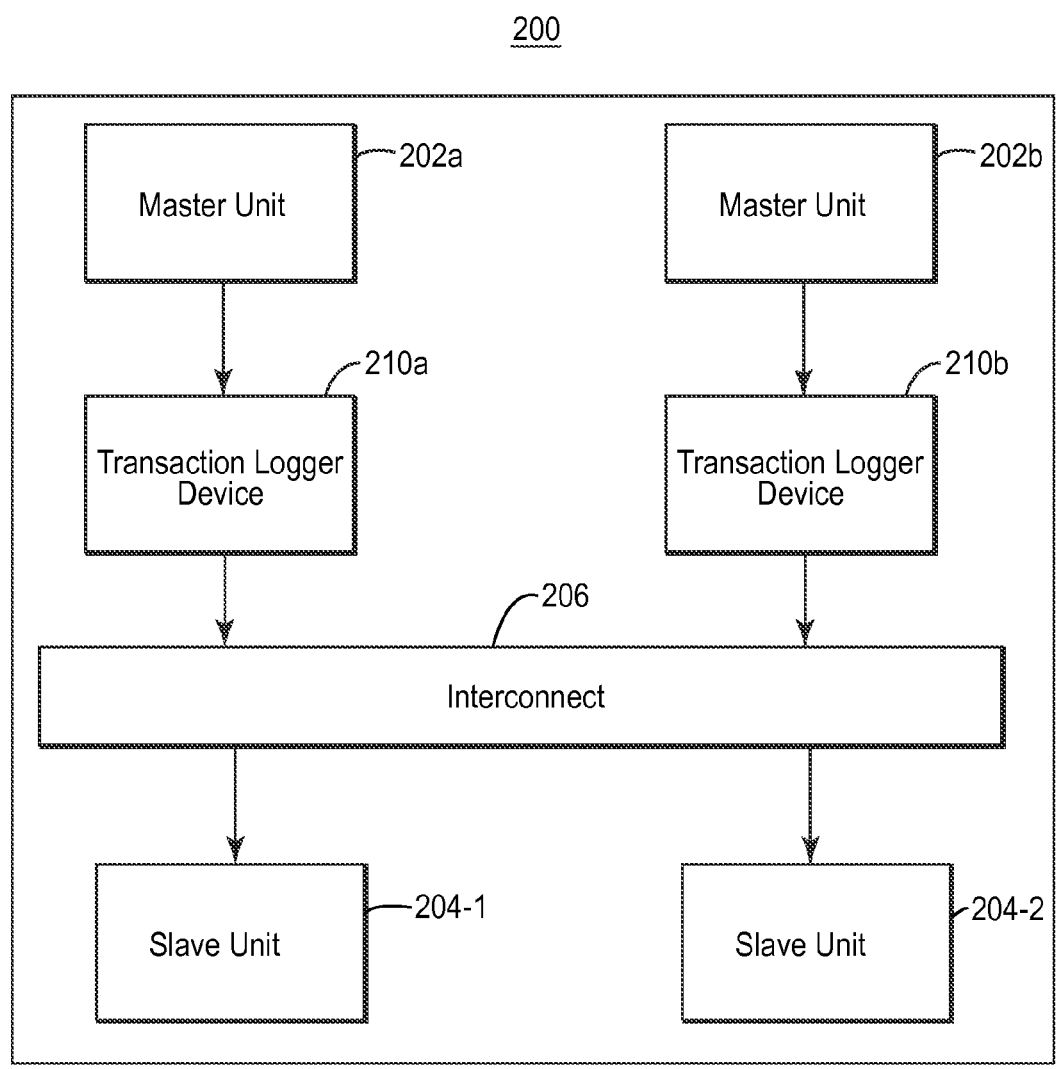
FIG. 2 is a schematic diagram of a computing device in which each master unit has a transaction logger device.

Thus, according to an embodiment illustrated in FIG. 2, a computing device 200 includes at least one master unit 202a, at least one slave unit 204-1, and an interconnect 206 connected to the at least one master unit 202a and to the at least one slave unit 204-1. Interconnect 206 is configured to route transactions from master unit 202a to slave unit 204-1 or to another slave unit 204-2. A transaction logger device 210a is configured to intercept and save a record of the outstanding transactions initiated by master unit 202a, and transaction logger device 210a is also configured to preserve the record of outstanding transactions when master unit 202a or other units are restarted.

Computing device 200 is illustrated with only two master units 202a and 202b and two slave units 204-1 and 204-2 for simplicity. Note that more or fewer master and slave units may be present, depending on the specifics of the computing device. Also note that interconnect 206 may be configured to connect any master unit to any slave unit. The embodiment illustrated in FIG. 2 has a transaction logger device for each master unit, irrespective of the nature of the master unit.

Figure 3:
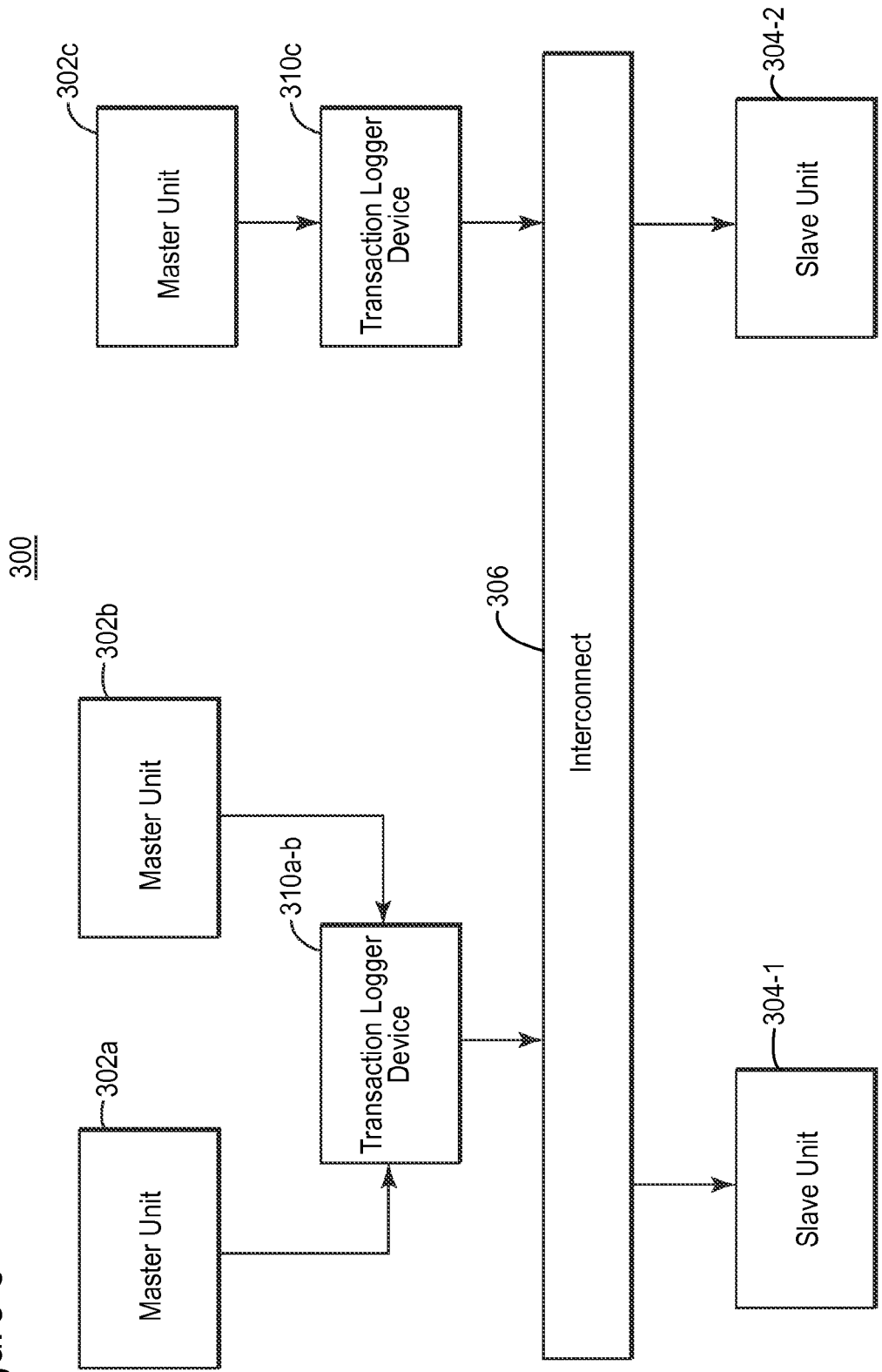
FIG. 3 is a schematic diagram of a computing device in which plural master units share a transaction logger device.
Figure 4:
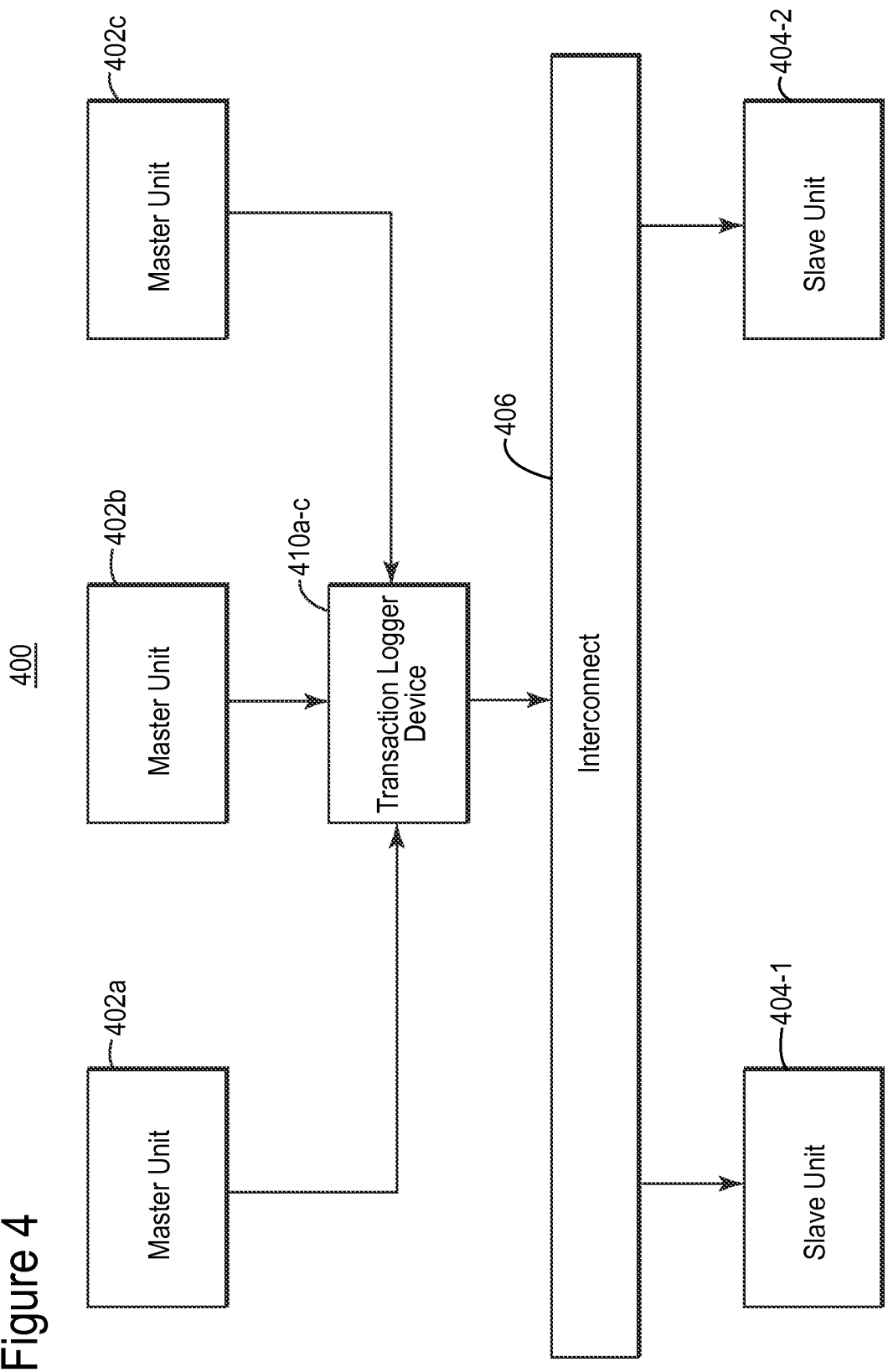
FIG. 4 is a schematic diagram of a computing device in which all master units share a single transaction logger device.

However, in another embodiment illustrated in FIG. 3, a computing device 300 has a group of master units 302a and 302b that share a single transaction logger device 310a-b, while another master unit 302c has its own transaction logger device 310c. Another embodiment illustrated in FIG. 4 has a computing device 400 in which all master units 402a to 402c share a same transaction logger device 410a-c. In one application, for any of the embodiments illustrated in FIGS. 2-4, the transaction logger device's presence is not known by the master units. In other words, the master unit does not control its associated transaction logger device. In one application, the master unit is not even aware of the transaction logger device's existence. Thus, the transaction logger device acts similar to a spy, i.e., intercepts all communication between master unit and interconnect and extracts predetermined information without making these parties aware of its actions. This feature ensures that in a master unit freeze, the transaction logger device is free and/or independent of manipulating the stored data to preserve it during and after the master unit restart.

Figure 5:
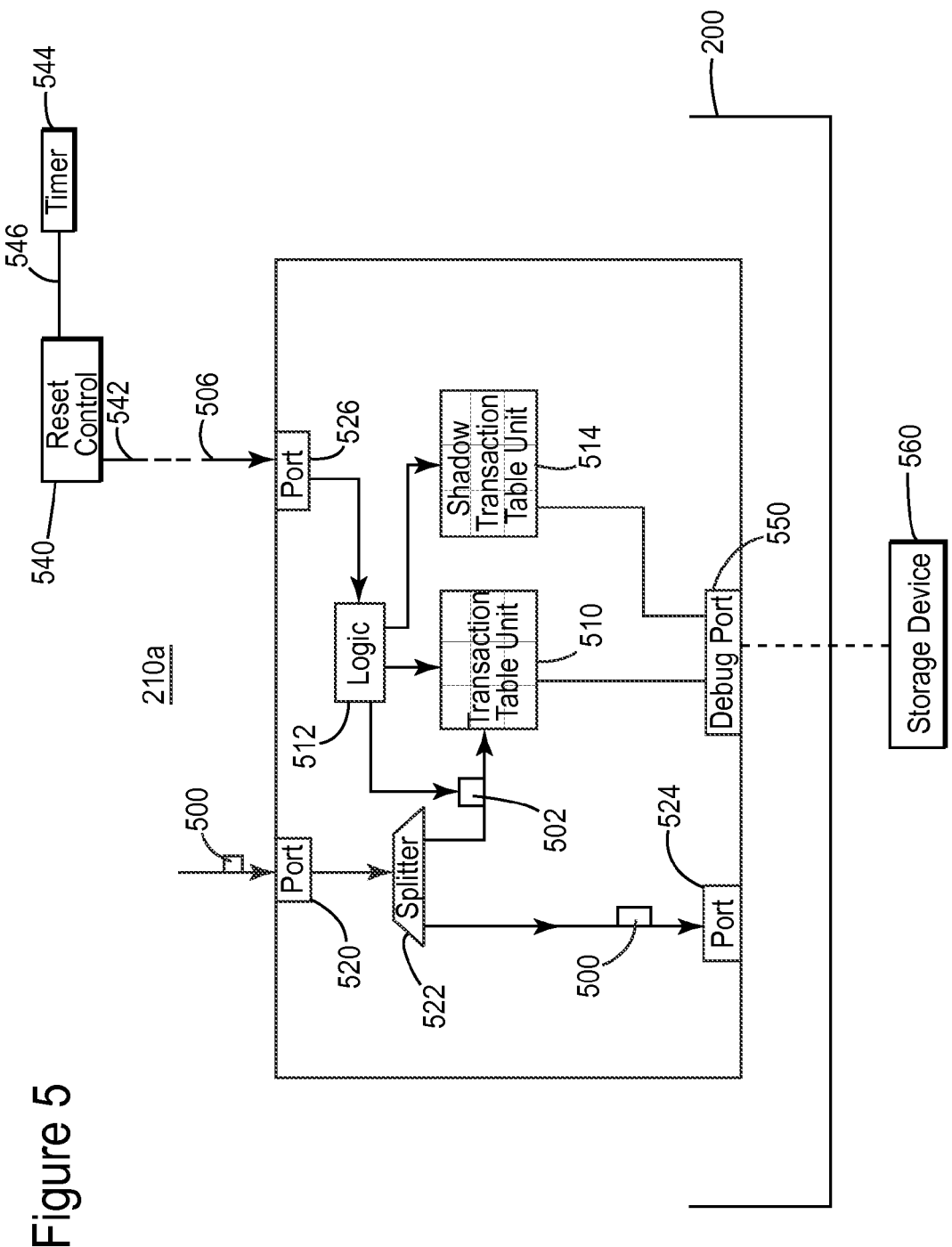
FIG. 5 is a schematic diagram of a transaction logger device.

By adding a dedicated transaction logger device, it is possible to save most, if not all, uncompleted (or outstanding) transactions that a master unit initiates on the interconnect. In one embodiment illustrated in FIG. 5, a more detailed inside structure of transaction logger device 210a is illustrated. Information associated with the master unit's outstanding transaction 500 may be saved in a transaction table unit 510. In one application, transaction table unit 510 is a memory storage device. More specifically, outstanding transaction 500 enters transaction logger device 210a at a port 520 and then travels to a splitter 522, where a data set 502 is generated and original transaction 500 is allowed to further travel to port 524, which communicates with the interconnect. In one application, data set 502 is identical to outstanding transaction 500. However, in another application, original transaction 500 is processed at splitter 522 to extract data set 502, i.e., generate a record related to outstanding transaction 500. If data set 502 is identical to outstanding transaction 500, logic 512 may act on it for extracting information related to the outstanding transaction, and the extracted information is stored in transaction table unit 510.

Data set 502 is then stored in transaction table unit 510, which may be structured as illustrated in FIG. 6. The information illustrated in FIG. 6 is related to two outstanding transactions, a read transaction 600 and a write transaction 602.

Transaction table unit 510 is illustrated in FIG. 6 as a table having a number of columns and rows. The number of rows corresponds to the number of outstanding transactions. In one embodiment, depending on the storage size of transaction table unit 510, completed transactions may be stored in addition to outstanding ones. In one embodiment, completed transactions are deleted one by one if more outstanding transactions are generated. The FIG. 6 example shows a first column for a transaction identification number, a second column for the type of transaction, a third column for an address identifying the destination for the transaction, and a fourth column storing transaction-related information, for example, if the transaction is a write, its related data can be saved. More columns may be added as necessary. For example, depending on the computing device's protocol, it may be necessary to have a column indicating whether the transaction is outstanding or not.

In one embodiment, the transaction table unit stores transactions where a slave unit response is expected. In a bus protocol where all transactions require a response, the transaction table unit would typically store all transactions from its associated master unit. If more master units are associated with the transaction table unit, then an extra column may identify which transaction corresponds to which master unit.

For a bus protocol handling transactions where a response is unnecessary, the transaction logger device can optionally filter out transactions that do not require a response and only store transactions requiring a response. For this latter type of bus protocol, the transaction logger unit may also store transactions that do not require a response as long as the memory in the transaction logger unit is not needed by transactions requiring a response.

When the response for a transaction is received, this transaction is marked as completed in the transaction table unit, and the transaction may be removed from the transaction table unit. As soon as the master unit initiates a new transaction, a new entry is added to the transaction table unit. In this example it is assumed that the Transaction ID in FIG. 6 is unique and can be used to handle the completion order of the transactions. Depending on the exact characteristics of the bus protocol, an additional sequence number or a timestamp can be saved in the transaction table to provide additional information and to handle the completion order of the transactions Instead of deleting a completed transaction, the completed transaction could be marked as such, but kept until it must be deleted to log new transactions. Then, in addition to the record of the outstanding transactions, a certain number M of completed transactions can be kept in the transaction table unit, for example, in a first-in, first-out (FIFO) system. Thus, when a transaction is completed, it is not directly removed from the transaction table, but only marked COMPLETED. Then, when M completed transactions are in the table and new entries need to be added, the oldest completed transaction is removed and replaced with a new transaction. In this way it is possible to see more transaction history for a certain master unit. If a system hangs due to an uncompleted transaction, it is now possible to see which M transactions completed successfully before the uncompleted transaction. The information in the transaction table unit survives in some form a reset of the system as explained later.

Returning to FIG. 5, transaction logger device 210a may also include a shadow transaction table unit 514 configured to save information from transaction table unit 510. In one embodiment, logic 512 coordinates with transaction table unit 510 and shadow transaction table unit 514 to copy information from one to the other.

There are various mechanisms that trigger logic 512 to act in this way. In one application, logic 512 receives a shutdown signal 506 from a shutdown port 526. The shutdown signal 506 may be generated, for example, by the computing device user pushing a restart button. This action triggers a reset control 540 to generate shutdown signal 506. A path 542 followed by this signal from reset control 540 to port 526 is independent of the master unit served by the transaction logger device 210a or other master units or slave units so that failure of these units does not affect this path. In this way, just prior to restarting the computing system, transaction logger device 210a becomes aware that the system is going to be restarted and saves information from transaction table unit 510 to shadow transaction table unit 514. In one application, shadow transaction table unit 514 may be a storage device.

In another application, shutdown signal 506 is triggered by a watchdog timer 544 that monitors, for example, a master unit corresponding to transaction logger device 210a. Shutdown signal 506 may be generated, for example, when the watchdog timer times out, as will be explained later. A path 546 followed by this signal from watchdog timer 544 to reset control 540 is independent of the master unit served by transaction logger device 210a or other master or slave units so that failure of these units does not affect this path. In this way, just prior to restarting the computing system, transaction logger device 210a becomes aware that the system is going to be restarted and thus, it saves information from transaction table unit 510 to shadow transaction table unit 514.

Transaction logger device 210a may also have a debug port 550 that communicates with a device external to the computing device for transferring the information stored in transaction table unit 510 or in shadow transaction table unit 514. This configuration is helpful if there is no shadow transaction table unit 514 and transaction table unit 510 does not preserve the information over the shutdown of the computing device. With this port in place, when the system hangs, it is possible to extract the information from the transaction table unit and store it in an outside storage device 560 prior to shutting down the computing device. Port 550 may be, for example, a debug port such as JTAG (Joint Test Action Group, which is the common name for the IEEE 1149.1 Standard Test Access Port and Boundary-Scan Architecture).

Figure 7:
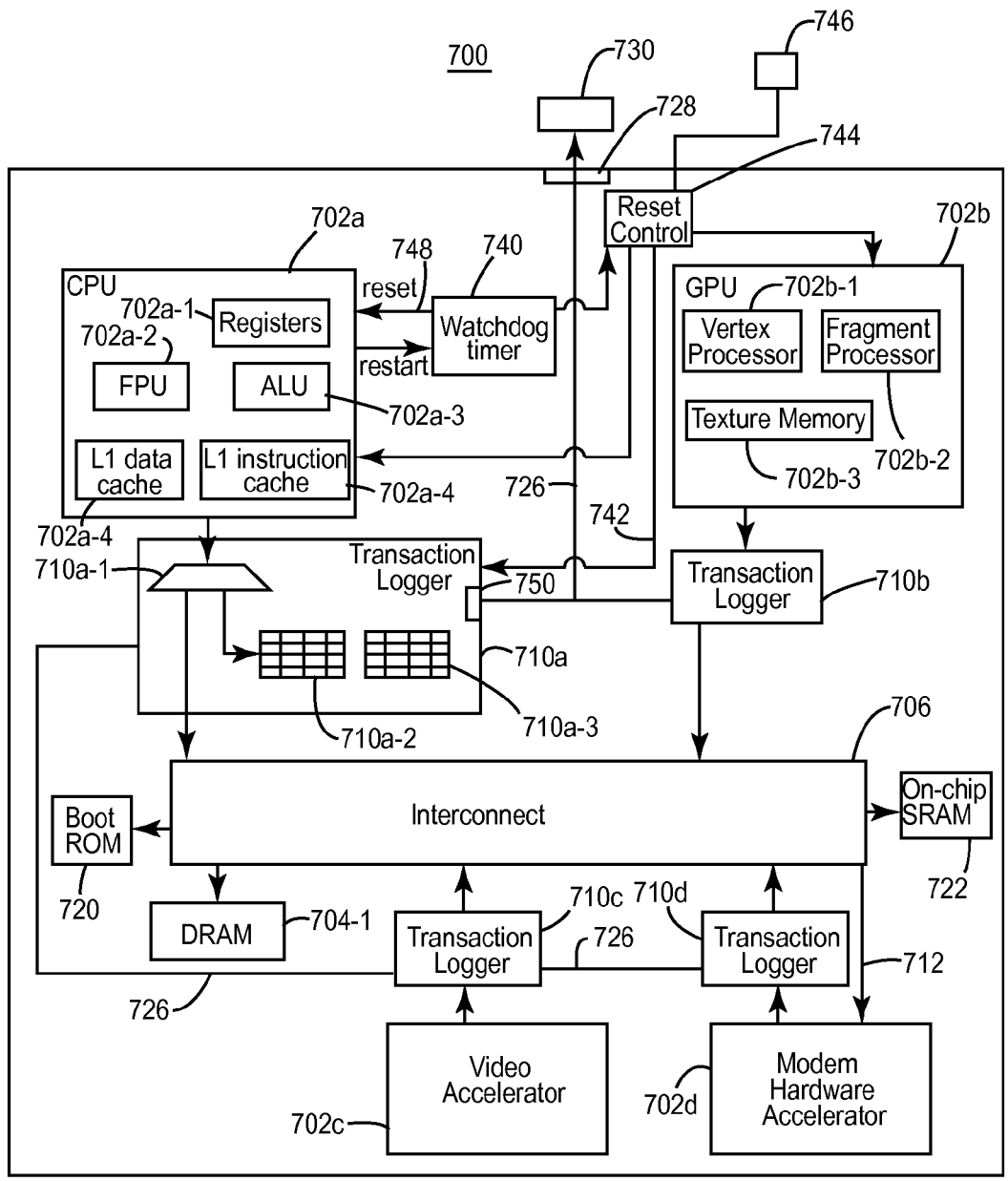
FIG. 7 is a schematic illustration of a computing device with plural transaction logger devices.

A process of collecting and saving information associated with master unit transactions is now discussed in the context of computing device 700, illustrated in FIG. 7. Computing device 700 may include one or more of the features discussed above with regard to FIGS. 2-6. For simplicity of explanation, computing device 700 is considered to have a transaction logger device for each master unit. Computing device 700 includes, in this embodiment, first master unit 702a (a processor), second master unit 702b (graphic processing unit), third master unit 702c (video accelerator), and fourth master unit 702d (modem hardware accelerator; note that the modem hardware accelerator is just an example and it should not be construed to limit the invention to those devices that include such accelerator. In other words, the novel concepts discussed herein apply to SoC or other computing devices that do not include a modem hardware accelerator). First master unit 702a may include some registers 702a-1, a floating point unit (FPU) 702a-2, an arithmetic logic unit 702a-3, an L1 data cache 702a-4, and an L1 instruction cache 702a-4. First master unit 702a has its own transaction logger device 710a. Note that comparing this embodiment to the structure illustrated in FIG. 1, transaction logger device 710a is in addition to cache unit 702a-4, which corresponds to cache 50 of the '946 patent. Transaction logger device 710a is shown in this embodiment to have splitter 710a-1, transaction table unit 710a-2 and shadow transaction table unit 710a-3, similar to the embodiment discussed in FIG. 5. Note that some transaction logger devices may have only transaction table unit 710a-2.

Second master unit 702b may include a vertex processor 702b-1, a fragment processor 702b-2, a texture memory 702b-3, and other elements known by those skilled in the art. Second master unit 702b has its own transaction logger device 710b. FIG. 7 also shows a slave unit 704-1, which happens to be a dynamic random access memory. Note that fourth master unit 702d may also act as a slave unit, as illustrated by path 712 from interconnect 706. Interconnect 706 may be connected to a boot read-only memory (ROM) 720 and to an on-chip static random access memory (SRAM) 722. A serial bus 726 is shown connecting the transaction logger devices to an external port 728. External port 728 is configured to be connected to an external storage device 730, for reasons to be discussed next.

Figure 8:
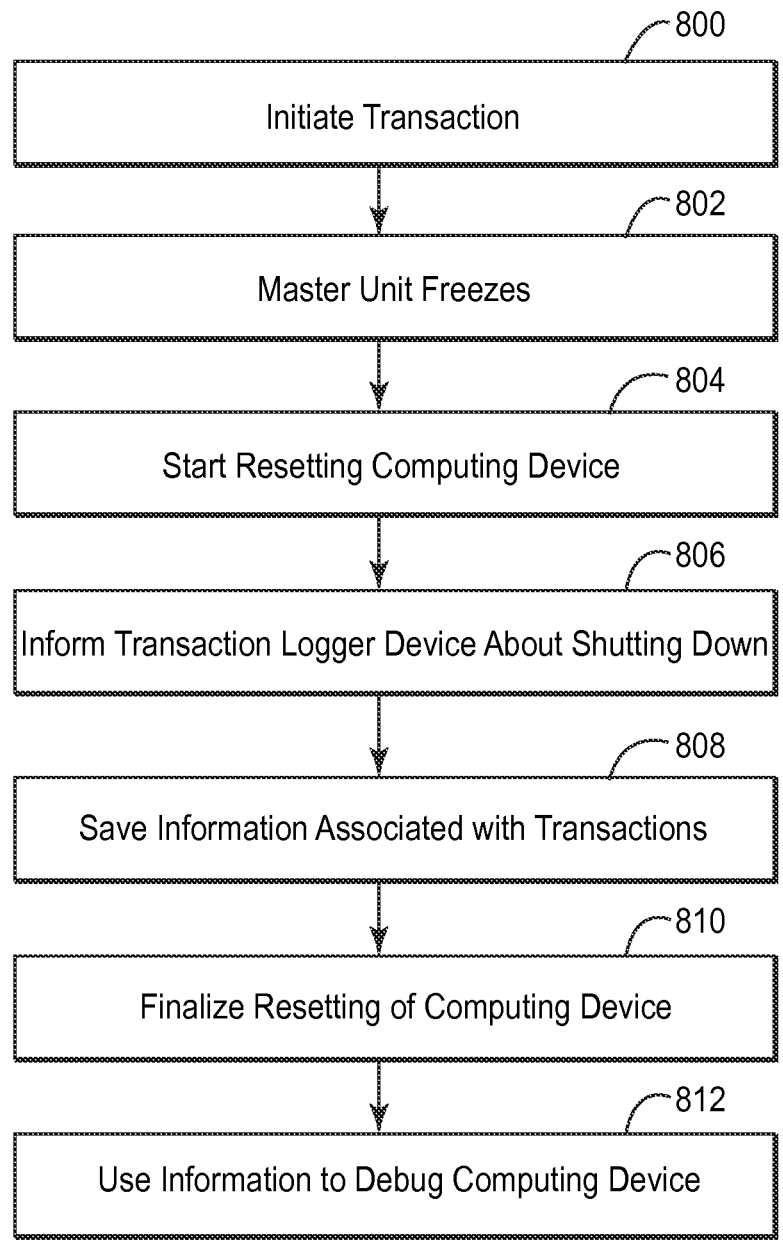
FIGS. 8 and 9 are flowcharts of methods for collecting and storing information associated with outstanding transactions initiated by a master unit in a computing device.

A process of saving a record associated with uncompleted transactions is now discussed with regard to FIG. 7 and the flowchart in FIG. 8. Suppose that master unit 702a has initiated in step 800 some transactions with one or more slave units, and at least one transaction is outstanding. In step 802, for any reason, master unit 702a freezes. This error is overcome by initiating a reset action, in step 804, by computing device 700. The resetting may be triggered by a reset actor 746 (e.g., a tester pressing a reset button or an application processor) that has observed the computing device being unresponsive or by watchdog unit 740 as discussed above with regard to FIG. 5. If the reset actor 746 initiates the reset, the reset control 744 generates the shut-down signal and sends it to transaction logger device 710a, along a path 742 independent of master unit 702a, so that the freeze condition of master unit 702a does not affect the ability of the reset control to communicate with the transaction logger device 710a. Similarly, if watchdog unit 740 detects that master unit 702a has stopped working, and an internal clock is timing out, watchdog unit 740 informs reset control 744, which sends the shut-down signal along path 742 directly to transaction logger device 710a. Reset control 744 is configured to communicate with one or more master units and to shut down them or the entire computing device if necessary.

Thus, irrespective of how the computing device is being shut down (by parts or in its entirety), prior to this action, transaction logger device 710a is informed in step 806 about this imminent act. As a consequence of step 806, information (record) related to outstanding transactions is saved in step 808 in a more permanent manner so it survives restarting of the computing device. Once the record is saved, the computing device shut-down is finalized in step 810. Then, in step 812, a tester or engineer uses the saved record to debug the computing device once it is restarted.

Step 808 may be implemented in different ways. A few examples are now discussed. According to a first implementation, consider that transaction logger device 710a has both the transaction table unit 710a-2 and shadow transaction table unit 710a-3. Further, consider that transaction table unit 710a-2 is a temporary memory and only shadow transaction table unit 710a-3 is a more permanent memory. Furthermore, assume that each master unit has its own transaction logger device with the above-noted structure.

When a reset is triggered, a corresponding signal is sent from reset control 744 to transaction logger device 710a, which reacts by copying the record from transaction table unit 710a-2 to shadow transaction table unit 710a-3, which retains the information after the reset is released. Entries in shadow transaction table unit 710a-3 can be extracted after the reset, while transaction table unit 710a-2 is used to log new transactions directly after the reset. Entries in shadow transaction table unit 710a-3 can be retrieved in various ways after the computing device has restarted. For example, master unit 702a can read information from the shadow transaction table unit because the computing device has now been reset. Then, if master unit is a processor as in FIG. 7, it can print the retrieved information to a console, save it to a file, display it on a screen, or even it via a short message (SMS) if the freeze happens in the field. Even if transaction table unit 710a-2 can be used as soon as the reset is released, it can be preferable to extract the information from the shadow transaction table unit and copy it to another memory location, like the on-chip SRAM 722 as soon as possible after reset to make sure the shadow transaction table unit is not overwritten with new information from transaction table unit 710a-2 in the event of a new reset.

In a variation of this embodiment, the record from the transaction table unit can be extracted, before the reset, for example, by using debug port 728 and associated serial bus 726.

In a different embodiment, assume that transaction logger device 710a has no shadow transaction table unit 710a-3. According to this embodiment, transaction logger device 710a has only transaction table unit 710a-2 for storing a record associated with outstanding transactions initiated by master unit 702a. The transaction table unit is designed such that the stored information persists over a reset. When a reset is triggered, the shutdown signal triggers the transaction logger device 710a to mark transaction table unit 710a-2 as read-only. Transaction table unit 710a-2 remains read-only until its information has been copied to another device, e.g., memory 722 (on-chip SRAM in this embodiment) after reset. After the information is copied to another memory, the transaction table unit is re-enabled for writing, so new transactions are logged in. This means there is a certain time interval after the reset when no transactions can be logged in. This configuration is acceptable if the period during which the transaction table unit is read-only is kept short. An advantage of this embodiment is that it requires less memory in the transaction logger device because it only needs to contain one transaction table unit.

Different methods can be used to extract transaction table information for this embodiment. According to one approach, information from the transaction table unit can be extracted before the reset is completed. This can be implemented, as previously discussed, using debug port 728.

In still another embodiment, there is a single transaction table unit for each transaction logger device, and each master unit has its own transaction logger device. However, in this embodiment, different from the others, information in the transaction table unit is lost after a reset. This means that the record in the transaction table unit needs to be extracted before or during the reset. Thus, according to this embodiment, debug port 728 is used to extract the record of outstanding transactions from the transaction logger device.

Figure 9:
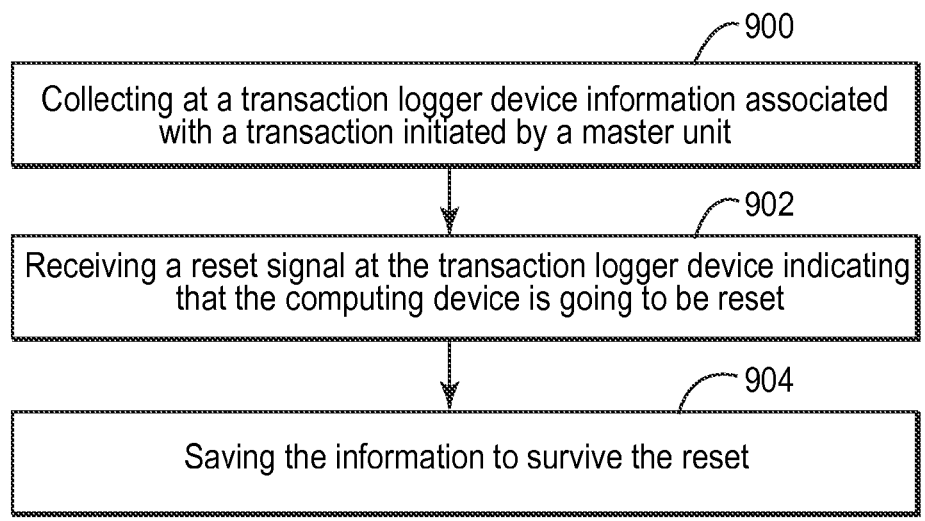

A method for saving information associated with a computing device reset is now discussed with regard to FIG. 9. The method includes a step 900 of collecting, at a transaction logger device, a record associated with an outstanding transaction initiated by a computing device master unit, a step 902 of receiving a reset signal at the transaction logger device indicating that the computing device is going to be reset, and a step 904 of saving the record to survive the reset. The outstanding transaction is sent to a slave unit over an interconnect structure.

One or more of the above-discussed embodiments advantageously saves a record of outstanding bus transactions when the system hangs, which is beneficial when trying to debug difficult system lockups. If a certain number M of completed transactions are kept in the transaction table unit in addition to uncompleted transactions, it is also possible to enhance the tester's ability to perform the debugging operation and more quickly identify the error causing the computing device to hang. Faster troubleshooting gives the manufacturer an edge bringing reliable products to market faster.

The disclosed embodiments provide a computing device and method for collecting and saving information associated with outstanding transactions initiated by a master unit so that the information may be used after the computing device is reset. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile disc (DVD), optical storage devices, or magnetic storage devices such a floppy disk or magnetic tape. Other non-limiting examples of computer readable media include flash-type memories or other known memories.

Although the features and elements of the present exemplary embodiments are described in the embodiments in particular combinations, each feature or element can be used alone without the other features and elements of the embodiments or in various combinations with or without other features and elements disclosed herein. The methods or flow charts provided in the present application may be implemented in a computer program, software or firmware tangibly embodied in a computer-readable storage medium for execution by a specifically programmed computer or processor.

What is claimed is:

1. A computing device comprising:
   at least one master unit;
   at least one slave unit;
   an interconnect structure configured to route transactions from the at least one master unit to the at least one slave unit; and
   a transaction logger device configured to receive transactions sent by the at least one master unit to the at least one slave unit via the interconnect structure, generate a data set for each of the received transactions, generate a record of outstanding transactions based on the generated data set for each of the received transactions, and save the record of outstanding transactions to a transaction table,
   wherein the transaction logger device is further configured to preserve the record of outstanding transactions in the transaction table to a shadow transaction table in response to a shutdown signal during which the at least one master unit is restarted upon the shutdown signal,
   wherein the transaction logger device is independent of the at least one master unit and the transaction logger device's presence is not known by the at least one master unit, and
   wherein the shadow transaction table is configured to preserve the record of outstanding transactions to be extracted using a debug port after the at least one master unit is restarted, while the transaction table is configured to lose the record of outstanding transactions after the at least one master unit is restarted.

2. The computing device of claim 1, wherein the at least one master unit is restarted because it freezes and the transaction logger device stores the record of outstanding transactions prior to freezing.

3. The computing device of claim 1, wherein the transaction logger device also stores a record of completed transactions.

4. The computing device of claim 1, further comprising:
   additional master units; and
   additional transaction logger devices.

5. The computing device of claim 4, wherein each additional transaction logger device is associated with a corresponding additional master unit.

6. The computing device of claim 4, wherein plural master units are associated with a single transaction logger device.

7. The computing device of claim 1, wherein the transaction logger device comprise the transaction table configured to store the record of outstanding transactions.

8. The computing device of claim 7, wherein the transaction logger device further comprises the shadow transaction table which is configured to mirror the record of outstanding transactions from the transaction table.

9. The computing device of claim 8, further comprising:
   a port configured to receive the shutdown signal based on which the transaction logger device copies the record of outstanding transactions from the transaction table to the shadow transaction table just prior to the restart,
   wherein the port receives the shutdown signal independent of the at least one master unit.

10. The computing device of claim 9, wherein the shutdown signal is generated by a reset control as a consequence of a reset button being pressed or of a watchdog device monitoring the at least one master unit timing out.

11. The computing device of claim 7, wherein the transaction table is marked as read-only when the shutdown signal is received at the transaction logger device.

12. The computing device of claim 11, wherein the record of outstanding transactions is transferred from the transaction table to a memory external to the transaction logger device after the at least one master unit has restarted and the read-only feature of the transaction table is changed after the transferred is achieved.

13. The computing device of claim 1, further comprising:
   a bus connected to the transaction logger device and configured to receive the record of outstanding transactions prior to restarting the at least one master unit,
   wherein the bus is independent of the at least one master unit.

14. The computing device of claim 13, further comprising:
   a storing device configured to be connected to the bus to store the record of outstanding transactions prior to restarting the at least one master unit.

15. The computing device of claim 14, wherein the storing device is removably attached to the bus.

16. The computing device of claim 1, wherein the generated data set is identical to a corresponding received transaction and the generation of the record of outstanding transactions involves extracting information related to each of the received transactions.

17. The computing device of claim 1, wherein generating the data set comprises extracting the data set from each of the received transactions and the generation of the record of outstanding transactions is based on the extracted data set.

18. A method for preserving information after a reset, the method comprising:
   receiving, by a transaction logger device, a transaction transmitted by a master unit of the computing device;
   generating, by the transaction logger device, a data set from the received transaction, generating a record associated with the received transaction based on the generated data set, and saving the generated record to a transaction table;
   receiving a reset signal at the transaction logger device indicating that the master unit is going to be reset; and
   saving, by the transaction logger device, the generated record in the transaction table to a shadow transaction table in response to the reset signal during which the master unit is restarted upon the reset signal,
   wherein the transaction is sent by the master to a slave unit over an interconnect structure,
   wherein the transaction logger device is independent of the at least one master unit and the transaction logger device's presence is not known by the at least one master unit, and
   wherein the shadow transaction table is configured to preserve the generated record to be extracted using a debug port after the master unit is restarted, while the transaction table is configured to lose the generated record after the at least one master unit is restarted.

19. The method of claim 18, wherein the saving of the generated record involves saving the record to the transaction table inside the transaction logger device when the outstanding transaction is initiated, the method further comprising:
 copying the record to the shadow transaction table inside the transaction logger device when the reset signal is received.

20. The method of claim 18, wherein the saving of the generated record involves saving the record to the transaction table inside the transaction logger device when the outstanding transaction is initiated, the method further comprising:
 changing a status of the transaction table to a read-only status when the reset signal is received.

21. The method of claim 18, wherein the step of saving comprises:
 copying the record from the transaction table to an external memory when receiving the reset signal and prior to resetting the computing device.

22. The method of claim 18, wherein the generated data set is identical to a corresponding received transaction and the generation of the record involves extracting information related to each of the received transactions.

23. The method of claim 18, wherein generating the data set comprises extracting the data set from each of the received transactions and the generation of the record is based on the extracted data set.

* * * * *